3,773,734
ETHYLENE AND α-OLEFINS COPOLYMERS AND
PROCESS FOR OBTAINING SAME
Salvatore Cucinella and Alessandro Mazzei, San Donato
Milanese, Italy, assignors to Snam Progetti S.p.A., San
Donato Milanese, Italy
Filed Nov. 6, 1970, Ser. No. 87,497
Claims priority, application Italy, Nov. 7, 1969,
24,109/69
Int. Cl. C08f 15/04
U.S. Cl. 260—88.2 R
7 Claims

ABSTRACT OF THE DISCLOSURE

Novel high molecular weight ethylene and α-olefin copolymers are disclosed which are amorphous at an ethylene mole content of up to 85% and are crystallizable when stretched. The induction of stretch crystallinity increases with the tensile stress and makes the copolymers particularly useful in the elastic fibers field.

---

The present invention refers to ethylene and α-olenfis copolymers and to the process for obtaining same.

More particularly it refers to ethylene-alpha-olefins copolymers which are completely amorphous at an ethylene moles content up to 85%, and present the characteristic of being crystallizable when subjected to stretch. Ethylene and α-olefins copolymers are known, which are obtained by employing Ziegler catalysts; but these copolymers generally present a X-ray crystallinity at an ethylene moles content lower than or equal to 70% owing to long ethylene blocks.

The copolymers, which are the object of the present invention, are completely amorphous in the raw state, in a very wide composition range, up to 85% by moles of ethylene.

It is then surprising that our copolymers, in a first time amorphous, have the property of crystallizing when subjected to stretch, giving rise to a crystallinity very different from the mere ethylene crystallinity. Such a crystallinity does not exist in ethylene and α-olefins copolymers having the same composition but obtained by means of different catalyst system.

The induction of the stretch crystallinity increases the tensile stress, giving our copolymers a higher strength and making them very interesting to some particular uses, for example to the employment in the elastic fibers field.

According to the process of the present invention, the polymerization is carried out in presence of a catalytic system comprising:

(a) an aluminum compound having the formula $AlRX_2$ wherein R is an alkyl, aryl or cycloalkyl radical and X is a halogen as Cl, Br and I;
(b) a vanadium compound having the formula $V(NR_2)_4$ wherein R is an alkyl, aryl or cycloalkyl radical.

The molar ratio between the aluminum compound and the vanadium compound varies in the range from 3:1 to 15:1. The reaction pressure may vary in a wide range, from the atmospheric pressure to 80 atmospheres. Likewise the temperature may vary in a wide range, from −30 to 120° C.; however, it is preferably to work at a temperature value near to the room one.

According to the process of the present invention the polymerization reaction is carried out in presence of a solvent inert to the same, which solvent may be selected from the aliphatic, aromatic or cycloaliphatic hydrocarbons, by saturating the reaction vessel with a gaseous mixture of a given composition of ethylene and α-olefin, and by making the saturation be constant for the whole reaction time.

The solution molar ratio between α-olefin and ethylene may vary in a large range, from 2:1 to 18:1.

According to the process of the present invention the α-olefin may be selected from propylene, butene-1 and its alkyl derivatives, pentene and its alkyl derivatives, hexene-1, styrene and so on. Very good results have been obtained by employing the ethylene-propylene mixture. Owing to the composition of the gaseout mixture of the monomers it is possible to obtain ethylene-propylene copolymers having an ethylene units content equal to or higher than 50%.

Particularly, by working with the $AlRX_2$—$V(NR_2)_4$ catalyst system, it is possible to obtain ethylene-propylene copolymers having a very high regular allotment of the two different monomers. In fact the obtained copolymers are completely amorphorous to X-rays at an ethylene moles content up to 85%.

The above limit is very higher than the one experimentally observed in copolymers obtained by means of some other catalytic systems, for which the X-ray examination shows an ethylene chains crystallinity at an ethylene content lower than or equal to 10% by moles. Moreover a particular characteristic of the ethylene-propylene copolymers, which are the object of the present invention, is the capacity of crystallizing when subjected to stretch, thereby perfectly amorphous raw products are possible to be transformed into crystalline copolymers.

The above crystallinity is just bound to the particular regularity of distribution of the propylene chains; therefore it is very different from the mere ethylene crystallinity. Such a crystallinity does not exist in ethylene-propylene copolymers having the same composition, but obtained by employing some different catalytic system.

The following examples are illustrating the present invention, which has not to be intended as limited by them.

Examples 1–4

360 cc. of heptane were poured into a stainless steel atuoclave having a 0.75 liters capacity. The reaction room was saturated by an ethylene-propylene gaseous mixture having a given composition and flowing at a 250 l./h. speed, the saturation being carried out at the established pressure, at 15° C. and under rotary stirring. Then both 0.75 mmoles of $V[N(C_2H_5)_2]_4$ and the necessary amount of $Al(C_2H_5)Cl_2$ were added, each of the catalyst components being diluted into 20 cc. of heptane.

The stirring was protracted for 15 minutes, the gas flow, the pressure and the temperature being constant; then the polymerization reaction was stopped by adding acetone. The polymer was coagulated by means of an acetone excess and then dried under vacuum at 50° C. The results obtained in some polymerization tests are reported in the table.

TABLE

Copolymerization tests of the ethylene-propylene mixture by using the $Al(C_2H_5)Cl_2$ and $V[N(C_2H_5)_2]_4$ catalyst. (Polymerization temperature=room temperature; polymerization duration=15 minutes.

| Test | Pressure ATA | C₃/C₂, molar ratio in solution | Heptane, ml. | V[N(C₂H₅)₂]₄, mmoles | Al/V, molar ratio | Obtained polymer | | |
|---|---|---|---|---|---|---|---|---|
| | | | | | | G. | Ethylene, percent b.w. | $[\eta]$* |
| 1 | 4 | 4 | 400 | 0.75 | 7 | 4.8 | 82 | 8.7 |
| 2 | 7 | 6 | 400 | 0.75 | 8 | 4.9 | 77 | 5.0 |
| 3 | 7 | 11 | 400 | 0.75 | 6 | 8.0 | 68 | 4.2 |
| 4 | 7 | 18 | 400 | 0.75 | 8 | 5.5 | 60 | N.D. |

*Determined at 135° C. in tetraline.

The particular kind of crystallinity of our copolymer is well pointed out in the FIG. 1, which shows the X-ray spectrum of a sample having an ethylene moles content equal to 77%, which spectrum having been taken by means of a cylindrical room (CuK$\bar{\alpha}$), before (FIG. 1/A) and after (FIG. 1/B) the stretch.

What we claim is:

1. A process for obtaining a high molecular weight ethylene-α-olefin copolymer characterized in that they are completely amorphous at an ethylene molar content of up to 77% and are crystallizable when subjected to stretch which comprises introducing into a polymerization area ethylene and an α-olefin, the molar ratios therebetween being eqivalent to the ratios required to form an ethylene-α-olefin solution having a molar ratio of from 2:1 to 18:1, in the presence of an inert solvent and a catalytically effective amount of a catalyst which comprises a vanadium compound having the formula V(NR$_2$)$_4$ wherein R is an alkyl, aryl or cycloalkyl radical in a molar ratio of from 3:1 to 5:1 to an aluminum compound having the formula AlRX$_2$ wherein R is an alkyl, or cycloalkyl radical and X is Cl, Br or I, at a temperature of from −30° to 120° C.

2. The process of claim 1 wherein the reaction is carried out at a pressure of from atmospheric to 80 atmospheres.

3. The process of claim 1 wherein the reaction is carried out at room temperature.

4. A process as defined by claim 1 in which the reaction zone is saturated by an ethylene-propylene gaseous mixture.

5. A process as defined by claim 1 wherein the inert solvent is heptane.

6. A process as defined by claim 1 wherein the α-olefin is propylene.

7. A process for obtaining a high molecular weight ethylene propylene copolymer characterized in that they are completely amorphous at an ethylene molar content of up to 77% and are crystallizable when subjected to stretch which comprises introducing into a polymerization area ethylene and propylene, the molar ratios therebetween being equivalent to the ratios required to form an ethylene propylene solution having a molar ratio of from 2:1 to 18:1, in the presence of an inert solvent and a catalytically effective amount of a catalyst which comprises a vanadium compound having the formula V(NR$_2$)$_4$ wherein R is an alkyl, aryl or cycloalkyl radical in a molar of from 3:1 to 5:1 to an aluminum compound having the formula AlRX$_2$ wherein R is an alkyl, or cycloalkyl radical and X is Cl, Br or I, at a temperature of from −30° to 120° C.

References Cited

UNITED STATES PATENTS

| 3,000,866 | 9/1961 | Tarney | 260—88.2 |
| 3,378,606 | 4/1968 | Kontos | 260—878 |
| 3,394,156 | 7/1968 | Kornicker | 260—429.5 |

OTHER REFERENCES

Copolymerization, ed. by George E. Ham, pp. 234–241. Interscience Publ., New York, 1964.

Cucinella, S. and Mazzei, A.: Copolimerizzazione Etilene-Propilene LaChimica E L'Industria, vol. 53, No. 7, Luglio 1971, pp. 653–661.

Communicazioni Brevi, LaChimica E L'Industria, vol. 51, No. 4, Aprile 1969, pp. 374–376.

Encyclopedia of Polymer Science and Technology, vol. 6, p. 359, Ethylene Polymers: Elastomeric Copolymers.

JOSEPH L. SCHOFER, Primary Examiner

R. S. BENJAMIN, Assistant Examiner

U.S. Cl. X.R.

252—429 A